3,474,134
PHENOXYETHYL-GUANIDINES AND THE
SALTS THEREOF
Frederick Charles Copp and Harold Francis Hodson, London, England, assignors to Burroughs Wellcome & Co. Inc., Tuckahoe, N.Y., a corporation of New York
No Drawing. Continuation-in-part of application Ser. No. 248,874, Jan. 2, 1963. This application Sept. 23, 1965, Ser. No. 489,730
Claims priority, application Great Britain, Mar. 30, 1960, 7,627/60; Sept. 13, 1960, 35,134/60; Jan. 20, 1961, 2,475/61; Sept. 7, 1965, 38,265/65
Int. Cl. C07c *129/12;* A61k *27/00*
U.S. Cl. 260—501.14                                3 Claims

ABSTRACT OF THE DISCLOSURE

Compounds useful in the treatment of hypertension, in particular, meta-substituted compounds of the formula

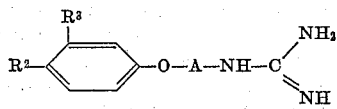

wherein $R^3$ is halogen or lower alkoxy, wherein $R^2$ is hydrogen or alkyl, wherein the phenoxy ring may be substituted at 2, 5 and 6 positions with hydrogen, halogen, nitro, alkyl, alkoxy, and wherein A is —$CH_2CH_2$— or —$CH(CH_3)CH_2$— or —$CH_2CH(CH_3)$— or $(CH_2)_3$—.

---

The present invention relates to phenoxyalkylguanidines and to the methods of using them, and is a continuation-in-part of U.S. application 89,125 filed on Feb. 14, 1961 and now U.S. Patent No. 3,099,599 and also of U.S. application 248,874 filed on Jan. 2, 1963 and now U.S. Patent No. 3,209,023, which itself was a continuation-in-part of U.S. application 89,125.

In application 89,125 a series of phenoxyalkylguanidines of Formula I is described.

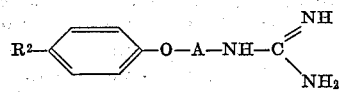

In Formula I,

A is a —$(CH_2)_2$—, —$CH_2.CH(CH_3)$—,
—$CH(CH_3)CH_2$— or —$(CH_2)_3$— group, $R^2$ is a hydrogen or halogen atom or an alkyl group containing from one to six carbon atoms or an acetamido or propionamido group; and the phenoxy ring carries in each of the 2, 3, 5 and 6 positions a hydrogen or halogen atom or a nitro group or an alkyl or alkoxy group containing from one to four carbon atoms.

It was stated in that application that the acid addition salts of the phenoxyalkylguaniidnes of Formula I have a specific sympatholytic action due to the depression of the adrenergic nerve mechanism and not due to a direct antagonism of adrenaline and its congenors, and are free or relatively free from parasympatholytic and parasympathomimetic properties.

The acid addition salts of the phenoxyalkylguanidines are useful in the treatment of hypertension and in one aspect there was provided by that invention a method for the treatment of hypertension which comprised the administration of such an acid addition salt.

The specific sympatholytic action of the acid addition salts of the compounds of Formula I resides in the bases, but the acid is preferably therapeutically ad pharmaceutically acceptable. Thus hydrochloric, hydrobromic and sulphuric acids are satisfactory; however in certain circumstances organic acids such as lactic, citric, and maleic acids offer specific advantages because of the physical properties of the salts so formed.

In one aspect, therefore, application No. 89,125 provided the acid addition salts of the phenoxyalkylguanidines of Formula I.

It has now been found that those compounds of Formula I wherein the phenoxy ring carries in the 3 position a halogen atom or an alkoxy group containing from one to four carbon atoms possess the property of depleting catecholamines from peripheral tissue but not from the brain, a property which is not apparent to any large extent at similar doses in the compounds claimed in application No. 248,874 or in the remainder of the compounds of Formula I which do not carry such a substituent in the 3 position. The property of depleting catecholamines peripherally means that those compounds having a meta-halo or meta-alkoxy group will probably produce a hypotensive effect by a different mechanism to that by which the rest of the compounds of Formula I act and the side effects can be expected to be different. A further indication of the mode of action of the meta-substituted compounds is that they depress the response to tyramine, a pressor amine which is believed to act by causing catecholamines to be released from their normal storage sites.

These meta-substituted compounds can be indicated by the sub-generic formula

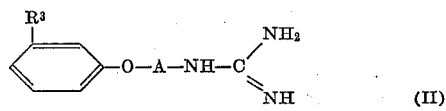  (II)

wherein $R^3$ is a halogen atom or an alkoxy group containing from one to four carbon atoms, the phenyl ring may also be substituted in the 2, 4, 5 and 6 positions as defined above for Formula I, and A is as defined above for Formula I. This Formula II is completely embraced by Formula I and so comments applicable to compounds of Formula I will also apply to compounds of Formula II, through the converse is not necessarily true.

In one aspect therefore the present invention provides the compounds of Formula II and their acid addition salts.

In another aspect the invention provides a method of producing a hypotensive effect which comprises administering a compound of Formula II.

Particularly preferred compounds of Formula II are acid addition salts of 2-(m-chlorophenoxy)ethylguanidine, 2 - (m - chlorophenoxy)propylguanidine, 2 - methoxyphenoxy)propylguanidine, 2 - (m - ethoxyphenoxy) propylguanidine and especially 2 - (m - chlorophenoxy) propylguanidine.

The phenoxyalkylguanidines of Formula I and acid addition salts thereof are synthesised by any method known for synthesising derivatives of guanidne. For example, they are synthesised by the reaction of guanidine itself or a salt thereof with a compound R³X, wherein R³ is a phenoxyalkyl group and X is a reactive atom or group, such as a halogen atom. As a further example, they are synthesised by the reaction of ammonia or an ammonium salt such as ammonium sulphate, thiocyanate or benzene-sulphonate with an S-substituted-N-phenoxyalkyl-isothiourea of formula $R_4SC(:NH)NHR^3$ or a salt thereof or with a cyanamide of formula $R^3NH \cdot CN$; or by the reaction of a primary amine $R^3NH_2$ or salt thereof with an S-substituted isothiourea of formula $$R^4SC(:NH)NH_2$$

or salt thereof or cyanamide itself $H_2N \cdot CN$; in these reactions R⁴ is a lower alkyl group such as a methyl or ethyl group and R³ is a phenoxyalkyl group.

The phenoxyalkylguanidines of Formula I and the acid addition salts produced by the above described reactions may be converted by double decomposition either during or after the reactions into respectively acid addition salts or salts of other acids For example, the hydrochlorides may be prepared from the iodides or sulphates by reaction with silver chloride or by warming with methanolic hydrogen chloride.

According to the present invention in one aspect, there are provided the above described methods for synthesising the phenoxyalkylguanidines of Forumla I and the acid addition salts thereof other than phenoxyethylguanidine base.

The phenoxyalkylguanidines of Formula I and the acid addition salts thereof may be presented in pharmaceutical preparations made by any of the methods known to pharmacy for making preparations. For oral administration, fine powders or granules of the guanidine or salt thereof may contain diluents and dispersing and surface active agents, and may be presented in a draft or drench in water or in a syrup; in capsules or cachets in the dry state or in a non-aqueous suspension, when a suspending agent may be included; or in a suspension in water or a syrup or an oil, or in a water/oil emulsion, when flavouring, preserving, suspending, thickening and emulsifying agents may be included; the granules or the tablets may be coated. For parenteral administration, the guanidine or salt thereof may be presented in aqueous or non-aqueous injection solutions which may contain anti-oxidants, buffers, bacteriostats and solutes which render the guanidine or salt isotonic with the blood; or in aqueous injection suspensions when suspending and thickening agents may be included; these injection solutions and suspensions are normally in unit dose or multidose containers; extemporaneous injection solutions may be made from sterile powders, granules or tablets which may contain diluents, dispersing and surface active agents, binders and lubricants. The guanidines or the salts may be also presented in food, or in suppositories or pessaries by incorporation in a suppository base.

The preferred forms of presentation for a specific sympatholytic action are tablets and injection solutions. The dose range of a phenoxyalkylguanidine of Formula I or of an acid addition salt thereof suitable for administration depends on a number of variable factors such as the activity and toxicity of the particular salt and of the particular base, the mode and frequency of administration of the particular compound and the method of making the pharmaceutical preparation. The dose range is, however, between 10 mg. and 1.0 g.; for continuous medication dosing two or three times a day may be desirable.

According to the present invention in two further aspects, there are provided pharmaceutical preparations containing a phenoxyalkylguanidine of Formula I or an acid addition salt thereof and an acceptable carrier therefor, and the methods of making such preparations by the inclusion of the guanidine or salt thereof with the acceptable carrier therefor.

The invention will now be described with reference to the following examples in which all temperatures are given in degrees centigrade.

EXAMPLE 1

A mixture of 1-bromo-2-(4-chloro - 2 - isopropyl-5-methylphenoxy)ethane (102 g.) and potassium phthalimide (70 g.) in dimethylformamide (50 ml.) was stirred and heated in an oil-bath. The bath temperature was raised slowly to 140° and maintained at that temperature for thirty minutes. The reaction mixture was poured into water, the mixture allowed to stand at room temperature for one hour, and the precipitated solid removed and dried. One recrystallisation from a mixture of ethanol and water gave the phthalimide derivative, melting point 83–86°.

A solution of the phthalimide derivative (107 g.) in boiling ethanol (750 ml.) was treated with hydrazine hydrate (38 ml.), and the solution heated to reflux. A voluminous white precipitate formed during the first five minutes of heating. After heating for three hours the mixture was treated cautiously with concentrated hydrochloric acid (80 ml.), heated on a steam-bath for fifteen minutes, and then cooled and filtered. The precipitate was washed well with water and the combined filtrate and washings evaporated under reduced pressure to remove most of the ethanol. The residue was diluted with water, made strongly basic with sodium hydroxide, and the precipitated oil isolated with ether in the usual manner, to give 1-amino-2-(4-chloro - 2 - isopropyl-5-methyl-phenoxy)ethane, boiling point 109–113°/0.09 mm.

This amine (50 g.) was treated with a solution of S-methylthiouronium sulphate (30 g.) in hot water (100 ml.); the mixture was diluted with ethanol (40 ml.) and the resulting solution heated under reflux for two hours, by which time evolution of methane thiol had ceased. The mixture was allowed to stand at 0° for one hour and the crystalline product was removed, washed with a little water and then with ether, and dried in vacuo. One recrystallisation from a mixture of ethanol and water gave pure 2-(4-chloro - 2 - isopropyl-5-methylphenoxy)ethylguanidine sulphate, melting point 234–236°.

EXAMPLE 2

A mixture of 1-bromo-2-(2-isopropyl - 5 - methylphenoxy)ethane (37 g.) and potassium phthalimide (30 g.) in dimethylformamide (20 ml.) was caused to react as described in the first part of Example 1, to give the phthalimide derivative which was converted to 1-amino-2-(2-isopropyl-5-methylphenoxy)ethane, boiling point 152–156°/12 mm.

This amine (5.03 g.) was treated with a solution of S-methylthiouronium sulphate (3.62 g.) in water (10 ml.) and the mixture warmed on the steam-bath for two hours and allowed to cool. The crystalline product was removed and twice recrystallised from a mixture of ethanol and water to give pure 2-(2-isopropyl-5-methylphenoxy)-ethylguanidine sulphate, melting point 221–222°.

EXAMPLE 3

Essentially as described in Examples 1 and 2, 1-bromo-2-(2-chlorophenoxy)ethane was converted to 1-amino-2-(2-chlorophenoxy)ethane, boiling point 150–153°/18 mm. and thence to 2-(2-chlorophenoxy)ethylguanidine sulphate, melting point 238°.

EXAMPLE 4

Essentially as described in Examples 1 and 2, 1-bromo-2-(2-isopropylphenoxy)ethane was converted to 1-amino-2-(2-isopropylphenoxy)ethane, boiling point 72–74°/0.02 mm. and thence to 2-(2-isopropylphenoxy)ethylguanidine sulphate, melting point 206°.

EXAMPLE 5

A mixture of 4-chloro-3-methylphenol (100 g.) and 1,2-dibromoethane (158.2 g.) in water (160 ml.) was stirred and heated to reflux during the slow dropwise addition of a solution of sodium hydroxide (30.8 g.) in water (140 ml.). Stirring and heating were continued for a total of six hours, and the mixture cooled and extracted exhaustively with ether. The ethereal extract was washed exhaustively with 5 N-sodium hydroxide, dried over potassium carbonate, filtered and evaporated. The residual oil was distilled under reduced pressure to give 1-bromo-2-(4-chloro-3-methylphenoxy)ethane, boiling point 106–112°/0.65 mm.

A mixture of this ethane (40 g.) and potassium phthalimide (29.7 g.) in dimethylformamide (30 ml.) was caused to react in the usual manner to give the phthalimide derivative, melting point 138°, which was converted to 1-amino-2-(4-chloro - 3 - methylphenoxy)ethane, boiling point 97–99°/0.2 mm.

This amine (6 g.) was treated with a solution of S-methylthiouronium sulphate (4.5 g.) in water (45 ml.) and the mixture was heated on a steam-bath for two hours. The crystalline product which separated on cooling was recrystallised from a mixture of ethanol and water to give pure 2-(4-chloro-3-methylphenoxy)ethylguanidine sulphate, melting point 203°.

EXAMPLE 6

A mixture of 4-t-pentylphenol (19 g.) and 1,2-dibromoethane (26.1 g.) in water (26 ml.) was stirred and heated to reflux during the dropwise addition of a solution of sodium hydroxide (5.1 g.) in water (12 ml.). Stirring and heating were continued for a total of six hours and the mixture worked up as in the first part of Example 1, to give 1-bromo-2-(4-t-pentylphenoxy)ethane, boiling point 108–114°/0.08 mm. This ethane was converted to the primary amine as in Examples 1 to 5 with the exception that the intermediate phthalimide derivative was not obtained crystalline.

1-amino-2-(4-t-pentylphenoxy)ethane boiled at 101–102°/0.04 mm. and was caused to react with S-methylthiouronium sulphate in the usual manner to give 2-(4-t-pentylphenoxy)ethylguanidine sulphate, melting point 262–264°, after three recrystallisations from a mixture of ethanol and water.

EXAMPLE 7

By the reaction sequence of Example 5, 3-chloro-4-methylphenol was converted to 1-bromo-2-(3-chloro-4-methylphenoxy)ethane, boiling point 168–171°, which was converted, via the phthalimide derivative, melting point 130–133°, to 1-amino-2-(3-chloro-4-methylphenoxy)ethane, boiling point 152–154°/14 mm.

This amine was reacted with S-methylthiouronium sulphate to give 2-(3-chloro-4-methylphenoxy)ethylguanidine sulfate, melting point 196–198°, after one recrystallisation from a mixture of ethanol and water.

EXAMPLE 8

Thionyl chloride (26 g.) was slowly added to 2-(3-methylphenoxy)propionic acid (30 g.). After standing at room temperature for 30 minutes, the resulting mixture was heated on a steam-bath for 3 hours and finally distilled in vacuo to give 2-(3-methylphenoxy)propionyl chloride, boiling point 126–132°/18 mm.

This chloride (30.5 g.) was gradually added to ice-cooled aqueous ammonia (d=0.880, 155 ml.) during a period of 30 minutes. The final mixture was allowed to warm to room temperature, and the insoluble product was filtered off and recrystallised from isopropanol to give 2-(3-methylphenoxy)propionamide, melting point 132–133°. A solution of this amide (9 g.) in dry tetrahydrofuran (200 ml.) was added slowly to a suspension of lithium aluminum hydride (3.8 g.) in dry ether. The final mixture was heated to reflux for 5½ hours; after cooling in ice it was treated slowly with ethyl alcohol (5 ml.) and then with 10 N-sodium hydroxide solution. The ethereal layer was decanted off from the inorganic paste, dried over solid potassium hydroxide, filtered and evaporated. The residual 2-(3-methylphenoxy)propylamine was distilled in vacuo, boiling point 18–130°/17 mm.

This amine (48 g) was added to a solution of S-methylthiouronium sulphate (8.1 g.) in water (50 ml.). The resulting mixture was stirred at 45° for 9 hours and at 60–70° for 5 hours; it was then evaporated in vacuo. The residue was extracted with boiling ethanol (25 ml.), and the insoluble portion filtered off. The filtrate was kept at 0° for 48 hours, when a crystalline solid separated. This was collected and recrystallised from ethanol and then from a mixture of ethanol and isopropanol (1:1) to give 2-(3-methylphenoxy)propylguanidine sulphate, melting point 137–139°.

EXAMPLE 9

1-amino-2-(3-methylphenoxy)ethane (10 g.) was treated with a solution of S-methylthiouronium sulphate (9.2 g.) in water (65 ml.), and the mixture heated on a steam-bath during 2½ hours. The crystalline material which separated on cooling was removed and twice recrystallised from a mixture of ethanol and water to give pure 2-(3-methylphenoxy)ethylguanidine sulphate, melting point 187°.

EXAMPLE 10

1-amino-2-(4-chlorophenoxy)ethane (5.14 g.) was treated with a solution of S-methylthiouronium sulphate (4.17 g.) in water (20 ml.). The mixture was heated on a steam-bath during 2 hours, allowed to cool, and the crystalline reaction product was removed and dried. Two recrystallisations from a mixture of ethanol and water gave pure 2-(4-chlorophenoxy)ethylguanidine sulphate, melting point 226–227°.

EXAMPLE 11

A mixture of 1-bromo-2-(4-bromophenoxy)ethane (14.0 g.) and potassium phthalimide (8.23 g.) in dimethylformamide(8 ml.)was stirred and heated in an oil-bath. The bath temperature was maintained at 180° during 3 hours and the reaction mixture cooled, poured into an excess of water, and extracted exhaustively with chloroform. The combined, dried (potassium carbonate) organic extracts were evaporated to dryness and the residue was recrystallised from propan-2-ol to give the phthalimide derivative, melting point 164–168°.

A suspension of the phthalimide derivative (9.8 g.) in boiling ethanol (300 ml.) was treated with hydrazine hydrate (3.6 ml.) and the mixture heated under reflux during 5 hours. During the first 10 minutes of heating the phthalimide derivative dissolved completely and a voluminous white precipitate was formed. The reaction mixture was made just acid with 5 N-hydrochloric acid, heated on a steam bath for a few minutes, cooled and filtered. The filtrate was evaporated under reduced pressure to small volume, made strongly basic with sodium hydroxide and the product isolated with ether in the usual manner. The pure 1-amino-2-(4-bromophenoxy)-ethane boiled at 156–158°/10 mm.

This amine (2.5 g.) was treated with a solution of S-methylthiouronium sulphate (1.6 g.) in hot water (10 ml.) and the mixture warmed on a steam-bath. Vigorous evolution of methane thiol ensued and the mixture became homogeneous. Heating was continued for 1½ hours, the solution cooled, and the crystalline reaction product removed and dried in vacuo. Two crystallisations from a mixture of methanol, and water gave pure 2-(4-bromophenoxy)ethylguanidine sulphate, melting point 228–230° (sinters at 224°).

EXAMPLE 12

A mixture of 1-bromo-2-(2,4,6-trichlorophenoxy)-ethane (24.3 g.) and potassium phthalimide (14.16 g.) in dimethylformamide (15 ml.) was converted, by the method of the first part of Example 3, via the phthalimide derivative, melting point 100–101°, to 1-amino-2-

(2,4,6-trichlorophenoxy)ethane, boiling point 174–176°/ 13 mm.

This amine (4.0 g.) was treated with a solution of S-methylthiouronium sulphate (2.32 g.) in water (12 ml.). The mixture was heated on a steam-bath when it became homogeneous and then began to deposit a crystalline solid. Heating was continued for 2 hours, the solution cooled and the reaction product removed and dried. Two recrystallisations from a mixture of methanol and water gave pure 2-(2,4,6-trichlorophenoxy)ethylguanidine sulphate, melting point 215–217°.

EXAMPLE 13

A solution of 1-bromo-2-(4-methylphenoxy)ethane (150 g.) in methanol (300 ml.) containing ammonia (60 g.) was heated in an autoclave for five hours at 100°. The reaction mixture was evaporated under reduced pressure to low volume, the residue treated with excess aqueous sodium hydroxide, and the precipitated oil isolated with ether in the usual way. Distillation under reduced pressure gave 1 - amino - 2 - (4 - methylphenoxy)ethane, boiling point 135–140°/14 mm.

This amone (10.06 g.) was treated with a solution of S-methylthiouronium sulphate (9.26 g.) in water (50 ml.). The resutling mixture was heated on the steam-bath for 1½ hours by which time evolution of methane thiol had ceased. The colourless crystalline solid which separated from the cooled recation solution was recrystallised three times from a mixture of ethanol and water to give pure 2-(4-methylphenoxy)ethylguanidine sulphate, melting point 195–196°.

EXAMPLE 14

A solution of 1-bromo-2-(2-methylphenoxy)ethane (107.5 g.) in methanol (212 ml.) containing ammonia (42.5 g.) was heated in an autoclave for six hours at 100°. The reaction mixture was worked up as described in the first part of Example 13 to give 1-amino-2-(2-methylphenoxy)ethane boiling point 130–134°/16 mm.

This amine (10.0 g.) was treated with a solution of S-methylthiouronium sulphate (9.3 g.) in hot water (20 ml.) and the resulting mixture heated on the steam-bath for 4 hours. On cooling, the solution immediately deposited a colourless crystalline solid, which was recrystallised three times from a mixture of ethanol and water to give pure 2-(2-methylphenoxy)ethylguanidine sulphate, melting point 216–217°.

EXAMPLE 15

A mixture of 4-chloro-3,5-dimethylphenol (100 g.) and 1,2-dibromoethane (149 g.) in ethanol (150 ml.) was stirred and heated to reflux during the slow dropwise addition of a solution of sodium hydroxide (29 g.) in water (130 ml.). Heating and stirring were continued for a total of six hours; the mixture was then cooled, evaporated to remove most of the ethanol, diluted with water and extracted exhaustively with ether. The dried ethereal extract yielded an oil which was distilled under reduced pressure to give 1-bromo-2-(4-chloro-3,5-dimethylphenoxy) ethane, boiling point 108–112°/0.04 mm.

A mixture of this bromide (47.5 g.) and potassium phthalimide (36.6 g.) in dimethylformamide (15 ml.) was stirred and heated to 140° for thirty minutes and the reaction mixture was worked up in the usual manner. The resulting phthalimide derivative, melting point 144–145°, was converted, as in the previous examples, to 1-amino-2-(4 - chloro - 3,5 - dimethylphenoxy)ethane, boiling point 167–170°/14 mm.

This amine (6.0 g.) was treated with a solution of S-methylthiouronium sulphate (4.17 g.) in water (15 ml.); ethanol (2 ml.) was added and the resulting solution was heated to reflux for two hours. The solid which separated from the cold reaction mixture was removed and twice recrystallised from a mixture of ethanol and water to give 2-(4-chloro-3,5-dimethylphenoxy)ethylguanidine sulphate, melting point 235–240°.

EXAMPLE 16

A mixture of 1-bromo-2-(2,6-dimethylphenoxy)ethane (16.2 g.) and potassium phthalimide (12.7 g.) in dimethylformamide (14 ml.) was stirred and heated in an oil-bath. The bath temperature was raised slowly to 140° and maintained at this temperature for thirty minutes. The cooled mixture was treated with water (100 ml.) and the precipitated oil extracted with ether. The dried (potassium carbonate) ethereal extract yielded a semi-crystalline mass which crystallised from aqueous ethanol to give the phthalimide derivative.

A solution of the phthalimide derivative (10.2 g.) in ethanol (60 ml.) was treated with hydrazine hydrate (5 ml.) and the mixture heated to reflux for three hours. A voluminous crystalline precipitate formed during the first ten minutes of heating. The cooled mixture was filtered, the residue washed with a little ethanol, and the combined filtrate and washings evaporated under reduced pressure. The residue was distributed between 2 N-hydrochloric acid (30 ml.) and ether (50 ml.), and the ethereal layer was discarded. The acid aqueous portion was made strongly basic with sodium hydroxide, and the precipitated oil isolated with ether in the usual manner, to give 1-amino-2-(2,6-dimethylphenoxy)ethane, boiling point 61–62°/0.05 mm.

This amine (2.0 g.) was treated with a warm solution of S-methylthiouronium sulphate (1.68 g.) in water (6 ml.). The mixture was warmed gently on a steam-bath, with swirling; methane thiol was evolved and at 50° the mixture became homogeneous. The resulting solution was heated to 70° for a further 1½ hours, cooled, and the crystalline precipitate removed and dried in vacuo. One recrystallisation from a mixture of water and propan-2-ol gave 2-(2,6-dimethylphenoxy)ethylguanidine sulphate as colourless plates, melting point 235–238°.

EXAMPLE 17

2,6-dimethylphenol (183 g.) was added to a solution of sodium (34.5 g.) in ethanol. The resulting dark-coloured mixture was heated on a steam-bath and stirred during the gradual addition of ethyl 2-bromopropionate (271.5 g.) over a period of 90 minutes. The final mixture was heated to reflux for a further hour, cooled and poured into water. The precipitated oil was extracted with ether in the usual way and the ethereal solution washed exhaustively with cold 2 N-sodium hydroxide to remove unchanged 2,6-dimethylphenol. The residual ethereal solution was dried over potassium carbonate, filtered and evaporated. The residue was distilled in vacuo to give ethyl 2-(2,6-dimethylphenoxy)propionate, boiling point 90–91°/0.25 mm.

This ester (80 g.) was added slowly to a suspension of lithium aluminium hydride (7.6 g.) in dry ether (300 ml.). The addition was completed in 2 hours, and the final mixture heated to reflux for a further 15 minutes. It was cooled in ice and decomposed with ethyl acetate (25 ml.). Water (25 ml.) was slowly added, followed by concentrated hydrochloric acid (25 ml.). The ethereal layer was decanted from the aqueous portion which was re-extracted with fresh ether. The combined ethereal extracts were washed with water, dried over potassium carbonate, filtered and evaporated. The residue was distilled in vacuo to give 2-(2,6-dimethylphenoxy)propan-1-ol.

This alcohol (55.3 g.) was cooled in ice and stirred whilst phosphorus tribromide (49.8 g.) was slowly added. The resulting mixture was stood at room temperature for 48 hours and finally heated on a steam-bath for 90 minutes. It was then cooled and poured on to ice. The precipitated oil was isolated with ether to give 1-bromo-2-(2,6-dimethylphenoxy)propane, boiling point 132–135°/14 mm.

A solution of this bromide (24.3 g.) in alcoholic ammonia (12% w./v.; 250 ml.) was heated in an autoclave for 6 hours (at 110°). The reaction mixture was evaporated and excess 5 N-sodium hydroxide added to the residue. The separated oil, 1-amino-2-(2,6-dimethylphenoxy)propane, was isolated with ether and distilled in vacuo, boiling point 126–128°/13 mm.

This amine (1.8 g.) was added to a solution of S-methylthiouronium sulphate (1.9 g.) in water (10 ml.). The mixture was stirred at 30–40° for 6 hours and finally at 60° for 1 hour. On cooling and scratching the separated oil crystallised to give 2-(2,6-dimethylphenoxy)propylguanidine sulphate, which was filtered off, washed with a little fresh water and crystallised once from a mixture of ethanol and ether, and then from a mixture of water and ethanol (4:1), melting point 200–201°.

EXAMPLE 18

2,6-dichlorophenol (72.5 g.) in ethanol (600 ml.) was added to a solution of sodium (10.4 g.) in ethanol (250 ml.). Ethylene dibromide (187 g.) was added and the resulting mixture heated to reflux for seven hours. The bulk of the ethanol was removed by evaporation under reduced pressure, water added to the residue, and the precipitated oil extracted with ether. The ethereal extract was washed exhaustively with 5 N-sodium hydroxide, dried over anhydrous potassium carbonate, filtered and evaporated. The residual oil was distilled under reduced pressure to give 1-bromo-2-(2,6-dichlorophenoxy)ethane, boiling point 157–160°/11 mm.

A mixture of this ethane (29.7 g.) and potassium phthalimide (18.5 g.) in dimethylformamide (10 ml.) was stirred and heated in an oil-bath. The bath temperature was raised slowly to 140° and maintained at that temperature for thirty minutes. The cooled mixture was treated with water and extracted exhaustively with chloroform. The combined, dried (potassium carbonate) chloroform extracts were evaporated under reduced pressure and the residue recrystallised from a mixture of ethanol and water to give the phthalimide derivative, melting point 120–121°.

A solution of the phthalimide derivative (17.0 g.) in hot ethanol (100 ml.) was treated with hydrazine hydrate (1.5 g.) and the mixture heated to reflux for three hours. A voluminous white precipitate formed during the first ten minutes of heating. The mixture was then treated cautiously with concentrated hydrochloric acid until acid to litmus, heated on a steam-bath for fifteen minutes, cooled and filtered. The precipitate was washed with a little water and the combined filtrate and washings evaporated under reduced pressure to remove most of the ethanol. The residue was diluted with water, made strongly basic with sodium hydroxide and the precipitated oil was isolated with ether in the usual manner to give 1-amino-2-(2,6-dichlorophenoxy)ethane, boiling point 140–142°/10 mm.

This amine (3.5 g.) was treated with a solution of S-methylthiouronium sulphate (2.35 g.) in warm water (20 ml.). The mixture was warmed to 70°; methane thiol was evolved and after ten minutes the mixture became homogeneous. The resulting solution was maintained at 70° for a total time of two hours, stored in the cold-room overnight, and the crystalline reaction product removed and dried in vacuo. One recrystallisation from a mixture of methanol and water gave pure 2-(2,6-dichlorophenoxyethyl)guanidine sulphate as colourless prisms, melting point 199–201°.

EXAMPLE 19

A mixture of 1-bromo-2-(2-bromophenoxy)ethane (46.2 g.) and potassium phthalimide (27.8 g.) in dimethylformamide (15 ml.) was converted, by the method of the second part of Example 18, via the phthalimide derivative, melting point 100–101°, to 1-amino-2-(2-bromophenoxy)ethane, boiling point 158–159°/15 mm.

1-amino-2-(2-bromophenoxy)ethane (2.48 g.) was treated with a solution of S-methylthiuronium sulphate (1.6 g.) in water (12 ml.) and the mixture heated on a steam-bath during one hour. The crystalline material which separated on cooling was removed and recrystallised from a mixture of methanol and water to give pure 2-(2-bromophenoxy)ethylguanidine sulphate, melting point 237°.

EXAMPLE 20

A mixture of 1-bromo-2-(2,4-dichlorophenoxy)ethane (14.27 g.) and potassium phthalimide (9.8 g.) in dimethylformamide (10 ml.) was caused to react as in the second part of Example 18 to give 1-amino-2-(2,4-dichlorophenoxy)ethane, boiling point 163–166°/15 mm.

This amine (2.06 g.) was treated with a solution of S-methylthiouronium sulphate (1.39 g.) in water (8 ml.) and the resulting mixture heated on a steam-bath during one hour. The crystalline material which separated on cooling was twice recrystallised from ethanol to give pure 2-(2,4-dichlorophenoxy)ethylguanidine sulphate, melting point 217–218°.

EXAMPLE 21

1-amino-2-(4-chloro-2-methylphenoxy)ethane (6.5 g.) was treated with a solution of S-methylthiouronium sulphate (4.88 g.) in hot water (12 ml.). The mixture was warmed on the steam-bath, treated with ethanol until homogeneous, and then heated under reflux for 2 hours. The product which separated from the cooled mixture had melting point 214–216°, and was recrystallised twice from a mixture of ethanol and water to give pure 2-(4-chloro-2-methylphenoxy)ethylguanidine sulphate, melting point 221–222°.

EXAMPLE 22

A mixture of 2-chloro-6-methylphenol (100 g.) and 1,2-dibromoethane (158 g.) in water (150 ml.) was stirred and heated to reflux during the slow, dropwise addition of a solution of sodium hydroxide (30.8 g.) in water (75 ml.). Stirring and heating were continued for a total of six hours and the reaction mixture was worked up in the usual way to give 1-bromo-2-(2-chloro-6-methylphenoxy)ethane, boiling point 88–98°/0.05 mm.

A mixture of this ethane (41.1 g.) and potassium phthalimide (52.5 g.) in dimethylformamide (40 ml.) was stirred and heated to 150° for 2 hours. The cooled reaction mixture was poured into water and extracted exhaustively with chloroform. The combined, dried chloroform extracts yielded a thick oil which crystallised from ethanol to give phthalimide derivative, melting point 92–93°. This compound (19 g.) in ethanol (150 ml.), was converted, in the usual way, with hydrazine hydrate (11.4 ml.), to 1-amino-2-(2-chloro-6-methylphenoxy)ethane, boiling point 146–148°/14 mm.

This amine (4 g.) was treated with a solution of S-methylthiouronium sulphate (3 g.) in hot water (15 ml.), and the mixture warmed on a steam-bath for 70 minutes. The reaction mixture was allowed to stand at 0° for one hour and the resulting crystalline product removed and dried in vacuo; it had melting point 186–193°. Two recrystallisations from a mixture of ethanol and water gave pure 2-(2-chloro-6-methylphenoxy)ethylguanidine sulphate, melting point 191–195°.

EXAMPLE 23

1-bromo-2-(2,5-dimethylphenoxy)ethane was converted, essentially as described in the previous examples, to 1-amino-2-(2,5-dimethylphenoxy)ethane, boiling point 133–136°/10 mm.

This amine (6.6 g.), by reaction with S-methylthiouronium sulphate (5.55 g.) in the usual manner, was converted to 2-(2,5-dimethylphenoxy)ethylguanidine sulphate, melting point 226–228°, after recrystallisation from a mixture of ethanol and water.

EXAMPLE 24

By the methods described in Example 14, 1-bromo-2-(3-nitrophenoxy)ethane was converted to 1-amino-2-(3- nitrophenoxy)ethane, boiling point 120–123°/0.01 mm., and thence to 2-(3-nitrophenoxy)ethylguanidine sulphate, melting point 219–220°.

EXAMPLE 25

A mixture of 3-methoxyphenol (90 g.) and 1,2-dibromoethane (164.4 g.) in ethanol (164 ml.) was stirred and heated to reflux during the slow, dropwise addition of a solution of sodium hydroxide (31.9 g.) in water (145 ml.). Stirring and heating were continued for a total of 6 hours and the mixture was worked up in the usual way to give 1-bromo-2-(3-methoxyphenoxy)ethane, boiling point 160–174°/12 mm.

This ethane was converted, by the methods of the above examples, to 1-amino-2-(3-methoxyphenoxy)ethane, boiling point 152–154°/12 mm. and thence to 2-(3-methoxyphenoxy)ethylguanidine sulphate, melting point 140–146°, after recrystallisation from ethano.

In Examples 26 to 30, the methods employed were essentially as described in the relevant parts of the preceding examples, the physical constants of hitherto undescribed compounds being given.

EXAMPLE 26

1 - bromo - 3-(4-chloro-2-isopropyl-5-methylphenoxy)propane, boiling point 123–124°, was obtained from the reaction between 1,3-dibromopropane and 4-chloro-2-isopropyl-5-methylphenol in the presence of aqueous sodium hydroxide. The propane was converted to 1-amino-3-(4-chloro-2-isopropyl-5-methylphenoxy)propane, boiling point 105–108°/0.02 mm. which reacted with S-methylthiouronium sulphate to give 3-(4-chloro-2-isopropyl-5-methylphenoxy)propylguanidine sulphate, melting point 143–145°, after recrystallisation from ethanol.

EXAMPLE 27

1 - bromo - 2-(2,6-di-isopropylphenoxy)ethane, boiling point 120°/12 mm., obtained from the reaction between 2,6-di-isopropylphenol and 1,2-dibromoethane by the method of Example 18, was converted to 1-amino-2-(2,6-di-isopropylphenoxy)ethane, boiling point 161–162°/20 mm. This amine was converted to a 2-(2,6-di-isopropylphenoxy)ethylguanidine sulphate, melting point 260–262°, after recrystallisation from a mixture of ethanol and water.

EXAMPLE 28

1-amino-2-(3,5-dimethylphenoxy)ethane, boiling point 134–136°/8 mm., obtained from the corresponding bromo-compound, was converted to the guanidine. Pure 2-(3,5 - dimethylphenoxy)ethyl guanidine sulphate had melting point 195–204°, after recrystallisation from a mixture of ethanol and water.

EXAMPLE 29

1-amino-2-(3,4-dimethylphenoxy)ethane, boiling point 136–137°/8 mm., obtained from the corresponding bromo-compound, was converted to 2-(3,4 - dimethylphenoxy)ethylguanidine sulphate, melting point 195–200°, after recrystallisation from a mixture of ethanol and water.

EXAMPLE 30

1-bromo - 3-(3-methylphenoxy)propane, boiling point 144–148°/10 mm., obtained from the reaction between 3-methylphenol and 1,3-dibromopropane, was converted to 1-amino-3-(3-methylphenoxy)propane, boiling point 139–140°/10 mm. This amine reacted with pure S-methylthiouronium sulphate to give 3-(3-methylphenoxy)propylguanidine sulphate, melting point 152–156° after recrystallisation from a mixture of ethanol and water.

EXAMPLE 31

A mixture of 3-methoxyphenol (90 g.) and 1,2-dibromoethane (164.4 g.) in ethanol (164 ml.) was stirred and heated to reflux during the dropwise addition of a solution of sodium hydroxide (31.9 g.) in water (145 ml.). Stirring and refluxing were continued for a total of 6 hours. Most of the ethanol was removed by distillation and the residue was diluted with water (100 ml.) and extracted with ether. The ether extract was washed thoroughly with 2 N-aqueous sodium hydroxide, dried over anhydrous potassium carbonate and evaporated. The residue was distilled under water-pump vacuum to give 1-bromo-2-3'-methoxyphenoxyethane, boiling point 160–174°/12 mm.

A mixture of 1-bromo-2-3' - methoxyphenoxyethane (57.8 g.) and potassium phthalimide (50.82 g.) in dimethylformamide (12 ml.) was stirred and heated in an oil-bath. The bath temperature was raised slowly to 140° and maintained at that temperature for 30 minutes. The reaction mixture was treated with water and the precipitated solid was removed and dried. One recrystallisation from ethanol gave the phthalimide derivative, melting point 114–115°. A solution of this phthalimide derivative (61 g.) in ethanol (200 ml.) was treated with hydrazine hydrate (25.6 ml.) and the solution heated to reflux for 3 hours. The mixture was cooled, treated cautiously with concentrated hydrochloric acid (54 ml.), heated on the steam-bath for 15 minutes, and then cooled and filtered. The precipitate was washed well with water and the combined filtrate and washings evaporated under reduced pressure to remove most of the ethanol. The residue was diluted with water, made strongly basic with sodium hydroxide and the precipitated oil was isolated in the usual manner to give 2-3'-methoxyphenoxyethylamine, boiling point 152–154°/12 mm.

2-3'-methoxyphenoxyethylamine (8.35 g.) was added to a solution of S-methylthiouronium sulphate (6.95 g.) in hot water (20 ml.). The mixture was heated on the steam-bath for 3 hours and then cooled. The crystalline product was filtered and dried in vacuo. Two recrystallisations from ethanol gave 2 - 3'-methoxyphenoxyethylguanidine sulphate, melting point 140–146°.

EXAMPLE 32

A mixture of 3-methoxyphenol (248 g.) and anhydrous potassium carbonate (280 g.) in dry ethyl methyl ketone (200 ml.) was heated to reflux during the dropwise addition of a solution of 2-chloro-propionitrile (89.3 g.) in dry ethyl methyl ketone (100 ml.) containing finely-powdered potassium iodide (2 g.). The addition took 20 minutes. Stirring and heating were continued for a total of 2 hours after which the mixture was cooled, poured into water (ca. 1 l.) and extracted with ether. The combined ether extract was washed several times with 2 N-sodium hydroxide to remove 3-methoxyphenol, dried over anhydrous sodium sulphate, and evaporated. The residue was distilled under water-pump vacuum to give pure 2-3'-methoxyphenoxypropionitrile, boiling point 156–162°/16 mm.

A solution of 2-3'-methoxyphenoxypropionitrile (50 g.) in dry ether (150 ml.) was added dropwise to a stirred suspension of lithium aluminium hydride (11 g.) in dry ether (300 ml.). The mixture was then heated to reflux for 3 hours, cooled and treated cautiously (vigorous stirring) with water (11 ml.), then with 15% aqueous sodium hydroxide (11 ml.) and finally with water (33 ml.). The mixture was stirred for 20 minutes and filtered. The filtrate was dried over anhydrous potassium carbonate and evaporated. The residue was distilled under water-pump vacuum to give 2-3'-methoxyphenoxypropylamine, boiling point 150–153°/14 mm.

2-3'-methoxyphenoxypropylamine (6 g.) was added to a solution of S-methylthiouronium sulphate (4.7 g.) in hot water (50 ml.) and the mixture was heated on the steam-bath for 2 hours. The hot solution was then treated with 2 N-aqueous sodium p-toluenesulphate solution (20 ml.), and the mixture allowed to stand at room temperature for 1 hour. The crystalline precipitate was filtered, washed with water and ether, and dried in vacuo. One recrystallisation from a mixture of propan-2-ol and ether, followed by recrystallisation from a mixture of acetone and ether, gave pure 2-3'-methoxyphenoxypropylguanidine p-toluenesulphonate, melting point 114–116°.

EXAMPLE 33

A mixture of 5-isopropyl-2-methylphenol (100 g.) and 1,2-dibromoethane (142 g.), in ethanol (142 ml.) was stirred and heated to reflux during the slow, dropwise addition of a solution of sodium hydroxide (27 g.) in water (105 ml.). Heating and stirring were continued for a total of six hours; the mixture was then cooled, evaporated to remove most of the ethanol, diluted with water and extracted with ether. The ethereal extract was washed exhaustively with Claisen's alkali, dried over anhydrous potassium carbonate, filtered and evaporated. The residue oil was distilled under reduced pressure to give a fraction, boiling point 143–163°/8 mm.; this was redistilled to give pure 1 - bromo-2-(5-isopropyl-2-methylphenoxy)ethane, boiling point 142–147°/8 mm.

A mixture of 1-bromo-2-(5-isopropyl-2-methylphenoxy) ethane (28 g.) and potassium phthalimide (21.8 g.) in dimethylformamide (10 ml.), was stirred and heated to 120° for one hour. The cooled reaction mixture was poured into an excess of water and the crystalline product was removed and dried. Recrystallisation from ethanol gave the phthalimide derivative, melting point 189–205°, which was converted to the primary amine in the usual manner. 1-amino-2-(5-isopropyl-2-methylphenoxy)ethane had boiling point 136–138°/8 mm.

1 - amino-2-(5-isopropyl-2-methylphenoxy)ethane (6.5 g.) was treated with a solution of S-methylthiouronium sulphate (4.65 g.) in hot water (10 ml.), and the mixture was heated on the steam-bath for 3 hours. The reaction mixture was cooled, and the crystalline product was removed and recrystallised from ethanol. One further recrystallisation from ethanol gave pure 2-(5-isopropyl-2-methylphenoxy)ethylguanidine sulphate, melting point 199–205°.

EXAMPLE 34

Essentially as in the relevant parts of preceding examples, 4-chloro-5-isopropyl-2-methylphenol was converted to 1 - bromo-2-(4-chloro-5-isopropyl-2-methylphenoxy) ethane, boiling point 169–175°/8 mm., and thence to 1 - amino - 2 - (4-chloro-5-isopropyl-2-methylphenoxy) ethane, boiling point 159–161°/8 mm.

This amine (3.5 g.) was caused to react with a solution of S-methylthiouronium sulphate (2.1 g.) in water (6 ml.) and ethanol (1 ml.). The reaction mixture was heated to reflux for 3 hours and then cooled. The reaction product was filtered and washed well with water and with ether to give a sticky solid. Three recrystallisations from a mixture of ethanol and water gave pure 2-(4-chloro-5-isopropyl-2-methylphenoxy)ethylguanidine sulphate, melting point 208–212°.

EXAMPLE 35

A mixture of 1-bromo-2-(2-methoxyphenoxy)ethane (23.7 g.) and potassium phthalimide (20 g.) in dimethylformamide (25 ml.) was stirred and heated in an oil-bath. The bath temperature was raised slowly and at 120° there was an exothermic reaction and the internal temperature rose to 130°. The oil-bath was maintained at 140° for 15 minutes and the reaction mixture was cooled somewhat and poured into an excess of water. The crystalline precipitate was removed, washed with a little water and dried in vacuo. Recrystallisation from propan-2-ol gave the phthalimide derivative, melting point 109–110.5° (sinters at 107°), which was converted, in the usual manner, to 1-amino-2-(2-methoxyphenoxy)ethane, boiling point 147°/11 mm.

This amine (5 g.) was treated with a solution of S-methylthiouronium sulphate (4.1 g.) in hot water (15 ml.). The solution was heated on the steam-bath for 2 hours; on cooling an oil was deposited and crystallised after several weeks at room temperature. This product was collected and twice recrystallised from a mixture of ethanol and water to give pure 2-(2-methoxyphenoxy) ethylguanidine sulphate, melting point 165–167°.

EXAMPLE 36

A mixture of 2,4-dichloro-3,5-dimethylphenol (47.8 g.) and 1,3-dibromopropane (60.6 g.) in ethanol (80 ml.) was stirred and heated to reflux during the slow, dropwise addition of a solution of sodium hydroxide (11 g.) in water (50 ml.). Heating and stirring were continued for a total of six hours and the reaction mixture was worked up in the usual manner to give 1-bromo-3-(2,4-dichloro-3,5-dimethylphenoxy)propane, boiling point 136–146°/0.15 mm.

As in previous examples this bromo-compound was converted via the phthalimide derivative, melting point 143–144°, to 1-amino-3-(2,4-dichloro-3,5-dimethylphenoxy)propane, boiling point 197–198°/10 mm.

1 - amino - 3 - (2,4-dichloro-3,5-dimethylphenoxy)propane (5.5 g.) in water (25 ml.) and ethanol (25 ml.), was treated with S-methylthiouronium sulphate (5.0 g.), and the mixture was heated to reflux for two hours and allowed to stand overnight. The crystalline product was removed and recrystallised from a large volume of 50% aqueous ethanol to give pure 3-(2,4-dichloro-3,5-dimethylphenoxy)propylguanidine sulphate, melting point 241–243°.

EXAMPLE 37

Essentially as in the relevant parts of preceding examples, 4-chloro-3,5-dimethylphenol was converted to 1-bromo-3-(4-chloro-3,5-dimethylphenoxy)propane, boiling point 184–190°/10 mm., and thence, via the phthalimide derivatives, melting point 147–149°, to 1-amino-3-(4-chloro-3,5-dimethylphenoxy)propane, boiling point 108–112°/0.04 mm.

This amine, with S-methylthiouronium sulphate, gave 3 - (4 - chloro-3,5-dimethylphenoxy)propylguanidine sulphate, melting point 232–234° after recrystallisation from a mixture of ethanol and water.

EXAMPLE 38

2-3'-chlorophenoxyethylguanidine sulphate was prepared according to the methods of Example 31, starting with 3-chlorophenol. After recrystallisation from a mixture of propan-2-ol and water, and from methanol it had a melting point 191.5–193°.

The intermediate 1-bromo-2-3'-chloroethane had boiling point 143–146°/12 mm., the phthalimide derivative had melting point 85–87°, and 2-3'-chlorophenoxyethylamine had boiling point 148–150°/16 mm.

EXAMPLE 39

2-3' - chlorophenoxypropylguanidine p-toluenesulphonate was prepared according to the methods of Example 32, starting with 3-chlorophenol. After recrystallisation from a mixture of acetone and water, and from a mixture of propan-2-ol and water it had a melting point 149.5–151°.

The intermediate 2-3'-chlorophenoxypropionitrile had a boiling point 149–153°/20 mm. and 2-3'-chlorophenoxypropylamine had a boiling point 142–146°/17 mm.

EXAMPLE 40

According to the method of Example 31, 2-m-ethoxyphenoxyethyl bromide (B.P. 158–160°/14 mm.) was prepared and treated with potassium phthalimide, to give a phthalimide derivative of M.P. 101–103°, which was then treated with hydrazine hydrate to give 2-m-ethoxyphenoxyethylamine, B.P. 158–162°&15 mm. According to the method of the last paragraph of Example 32 this amine was treated with S-methylthiouronium and then the p-toluenesulphonate was isolated. After recrystallisations from a mixture of propan-2-ol and water and then a mixture of acetone and water, 2-m-methoxyphenoxyethyl guanidine p-toluenesulphonate had M.P. 159–160°.

EXAMPLES 41–44

According to the method of Example 32 the following amine intermediates were prepared by reducing the corresponding nitrile with lithium aluminium hydride.

$$ArOCH(CH_3)CN \rightarrow ArOCH(CH_3)CH_2NH_2$$

These amines were then treated with S-methylthiouronium sulphate to give the guanidine, which was isolated as the p-toluenesulphonate or sulphate according to the last paragraph of Example 31 or 32 and this was then purified by recrystallisation.

| Intermediate for Example No. | Ar- | Nitrile | Amine |
|---|---|---|---|
| 41 | m-Ethoxyphenyl | 158–162°/14 mm | 156–158°/12 mm. |
| 42 | 3,5-dimethoxyphenyl | 181–184°/17 mm | 184–186°/16 mm. |
| 43 | 3-propoxyphenyl | 176–178°/20 mm | 169–173°/16 mm. |
| 44 | 3-methoxy-5-methylphenyl | 164–166°/13 mm | 162–164°/17 mm. |

We claim:
1. An acid addition salt of 2-(m-methoxyphenoxy)ethylguanidine.
2. An acid addition salt of 2-(3-chloro-4-methylphenoxy)ethylguanidine.
3. An acid addition salt of 2-(3-nitrophenoxy)ethylguanidine.

| Example No.: | -guanidine | Salt | Crystallisation solvent [1] | M.P., ° |
|---|---|---|---|---|
| 41 | 2-m-ethoxyphenoxyethyl | p-Toluenesulphonate | 1 | 178–180 |
| 42 | 2-(3,5-dimethoxyphenoxy)propyl | do | 2 | 139–140 |
| 43 | 2-m-propoxyphenoxypropyl | do | 3, 4 | 155–156 |
| 44 | 2-(3-methoxy-5-methylphenoxy)propyl | Sulphate | 3, 4 | 203–204 |

[1] Recrystallisation solvents:
 1. A mixture of ethanol and water.
 2. A mixture of propan-2-ol and ether.
 3. A mixture of propan-2-ol and water.
 4. A mixture of acetone and water.

References Cited

UNITED STATES PATENTS

| | | | |
|---|---|---|---|
| 3,159,676 | 12/1964 | Spickett et al. | 260—564 |
| 3,174,997 | 3/1965 | Campbell | 260—564 XR |
| 3,246,031 | 4/1966 | Campbell | 260—501 |

FOREIGN PATENTS 947,001   1/1964   Great Britain.

OTHER REFERENCES

Barron et al., Jour. Med. Chem., vol. 6, No. 6, pp. 705–11 (1963).

ROBERT V. HINES, Primary Examiner

U.S. Cl. X.R.

260—326, 465, 471, 473, 521, 544, 551, 559, 562, 564, 570.7, 612, 618, 809, 999; 424—326